(12) United States Patent
Willats et al.

(10) Patent No.: US 10,927,744 B2
(45) Date of Patent: Feb. 23, 2021

(54) INSULATED COMPOSITE HEAT SHIELD FOR VEHICLE EXHAUST SYSTEM

(71) Applicant: Faurecia Emissions Control Technologies, USA, LLC, Columbus, IN (US)

(72) Inventors: Robin Willats, Columbus, IN (US); Jerome Brian Hornback, Indianapolis, IN (US); Jeffery Warren Prairie, Franklin, IN (US); John G. Rohde, Columbus, IN (US); Thibaut Contremoulins, Belfort (FR); Maria Saur, Augsburg (DE)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 6 days.

(21) Appl. No.: 16/085,284

(22) PCT Filed: Mar. 23, 2017

(86) PCT No.: PCT/US2017/023717
§ 371 (c)(1),
(2) Date: Sep. 14, 2018

(87) PCT Pub. No.: WO2017/165589
PCT Pub. Date: Sep. 28, 2017

(65) Prior Publication Data
US 2019/0085749 A1    Mar. 21, 2019

Related U.S. Application Data

(60) Provisional application No. 62/312,541, filed on Mar. 24, 2016.

(51) Int. Cl.
*F01N 13/14* (2010.01)
*F01N 3/20* (2006.01)
(Continued)

(52) U.S. Cl.
CPC ......... *F01N 13/141* (2013.01); *B01D 53/944* (2013.01); *B01D 53/9418* (2013.01);
(Continued)

(58) Field of Classification Search
CPC combination set(s) only.
See application file for complete search history.

(56) References Cited

U.S. PATENT DOCUMENTS 3,233,699 A * 2/1966 Plummer ................ F01N 13/14
181/243
4,031,700 A * 6/1977 Yamazaki ............... F01N 13/14
60/322
(Continued)

FOREIGN PATENT DOCUMENTS

DE   202014104869 U1   1/2016
EP       2703614 A1   3/2014
(Continued)

OTHER PUBLICATIONS

International Search Report and Written Opinion for PCT/US2017/023713, dated Jun. 28, 2017.
(Continued)

*Primary Examiner* — Binh Q Tran
(74) *Attorney, Agent, or Firm* — Carlson, Gaskey & Olds, P.C.

(57) ABSTRACT

An exhaust component assembly includes a heat shield formed from a composite material and a mounting structure that attaches the heat shield to an outer housing of an exhaust component. The mounting structure comprises an insulator located between an outer surface of the outer housing an inner surface of the heat shield. A method of assembling the composite heat shield to the outer housing of the exhaust component assembly is also disclosed.

26 Claims, 6 Drawing Sheets

(51) Int. Cl.
    *F01N 3/28*   (2006.01)
    *F01N 13/18*  (2010.01)
    *B01D 53/94*  (2006.01)
    *F01N 13/16*  (2010.01)

(52) U.S. Cl.
    CPC ....... *B01D 53/9477* (2013.01); *F01N 3/2066* (2013.01); *F01N 3/2892* (2013.01); *F01N 13/148* (2013.01); *F01N 13/16* (2013.01); *F01N 13/1805* (2013.01); *F01N 2240/20* (2013.01); *F01N 2260/20* (2013.01); *F01N 2610/02* (2013.01); *F01N 2610/1453* (2013.01); *Y02A 50/20* (2018.01); *Y02T 10/12* (2013.01)

(56) References Cited

U.S. PATENT DOCUMENTS

| | | | | |
|---|---|---|---|---|
| 5,816,043 A * | 10/1998 | Wolf | ................... | F01N 13/102 60/272 |
| 5,882,608 A | 3/1999 | Sanocki et al. | | |
| 5,953,912 A * | 9/1999 | Kaiho | ................... | F01N 13/102 60/322 |
| 5,974,784 A * | 11/1999 | Feldman | ................ | B01D 53/94 165/185 |
| 6,041,595 A | 3/2000 | Halimi et al. | | |
| 6,438,949 B1 | 9/2002 | Nozaki | | |
| 6,555,070 B1 * | 4/2003 | Kruger | ................. | F01N 3/2853 422/177 |
| 6,598,389 B2 * | 7/2003 | Chen | .................... | F01N 13/102 123/169 PH |
| 7,007,720 B1 * | 3/2006 | Chase | ..................... | F16L 59/12 138/110 |
| 7,976,788 B2 | 7/2011 | Drost et al. | | |
| 8,951,323 B2 | 2/2015 | Kumar | | |
| 2006/0065480 A1 | 3/2006 | Leehaug | | |
| 2014/0196442 A1 | 7/2014 | Katou et al. | | |
| 2014/0342115 A1 | 11/2014 | Sakane et al. | | |
| 2015/0000259 A1 * | 1/2015 | Dietz | ................... | F16L 59/027 60/320 |
| 2015/0260075 A1 | 9/2015 | Schweiggart | | |
| 2015/0267596 A1 * | 9/2015 | Tobben | .................. | F01N 13/08 60/274 |
| 2017/0184007 A1 * | 6/2017 | Davidson | ............... | B60R 13/08 |

FOREIGN PATENT DOCUMENTS

| | | |
|---|---|---|
| JP | 2006009693 A | 1/2006 |
| JP | 2007162570 A | 6/2007 |
| WO | 2015012829 A1 | 1/2015 |

OTHER PUBLICATIONS

International Search Report and Written Opinion for PCT/US2017/023715, dated Jun. 28, 2017.
International Search Report and Written Opinion for PCT/US2017/023717, dated Jun. 28, 2017.
International Search Report and Written Opinion for PCT/US2017/023720, dated Jun. 28, 2017.

\* cited by examiner

INSULATED COMPOSITE HEAT SHIELD FOR VEHICLE EXHAUST SYSTEM

RELATED APPLICATION

This application claims priority to U.S. Provisional Application No. 62/312,541, filed Mar. 24, 2016.

BACKGROUND OF THE INVENTION

Vehicles include an exhaust system that transports exhaust gas generated by a combustion engine to a location on the vehicle where the heated exhaust gas can be emitted safely. Exhaust systems can include various combinations of the following components: pipes, tubes, resonators, converters, catalysts, filters, mixers, mufflers, etc. The entire exhaust system becomes very hot after a short period of operation due to the high temperatures generated during the combustion processes that produce the exhaust gas. As such, one or more of the components often utilize an outer heat shield to reduce the overall exposed external surface temperature of the components.

A typical heat shield is a thin sheet of metal that is stamped or otherwise formed to conform generally to the shape of the component to which the heat shield is to be attached, such as a muffler for example. The heat shield may be formed with legs or other structures that provide areas for attaching the heat shield to the muffler. Remaining portions of the heat shield are spaced along an outer surface of the muffler to insulate external areas of the shield from the muffler. The heat shield is typically secured to the muffler by welding; however, other attachment methods, such as straps, rivets, etc. have been used additionally or alternatively.

In certain environments it is important to shield as much of a hot exhaust component as possible. For example, some specifications may require as high as 99% of the outer surface of the component to be less than a specified temperature. This requirement can be difficult to achieve with larger components and with components having complex shapes. Further, the various attachment structures used to attach the heat shield to the component provide direct conduits for transferring heat to the heat shield, which can make it difficult to maintain a desired low outer surface temperature.

SUMMARY OF THE INVENTION

According to one exemplary embodiment, an exhaust component assembly includes a heat shield formed from a composite material and a mounting structure that attaches the heat shield to an outer housing of an exhaust component. The mounting structure comprises an insulator located between an outer surface of the outer housing an inner surface of the heat shield.

In another embodiment according to the previous embodiment, the exhaust component defines a center axis and the heat shield has an outer surface spaced radially outward of the inner surface of the heat shield. In one example, an additional layer of insulating material is attached to one or both of the inner and outer surfaces of the heat shield.

In another embodiment according to any of the previous embodiments, the heat shield includes at least one internal cavity encapsulated within the heat shield.

In another embodiment according to any of the previous embodiments, the insulator comprises a primary insulator and at least one secondary insulator positioned adjacent the primary insulator.

In another exemplary embodiment, a method of assembling a heat shield to an outer housing of an exhaust component assembly includes providing a heat shield made from a composite material, and supporting the heat shield on a mounting structure configured to attach the heat shield to an outer housing of an exhaust component, wherein the mounting structure comprises an insulator located between an outer surface of the outer housing an inner surface of the heat shield.

In another embodiment according to any of the previous embodiments, the heat shield is compressed against the outer housing.

In another embodiment according to any of the previous embodiments, the heat shield is formed by thermo-forming, molding, or additive manufacturing.

In another embodiment according to any of the previous embodiments, one or more protrusions are integrally formed with the heat shield to extend out from an outer surface of the heat shield.

These and other features of the present invention can be best understood from the following specification and drawings, the following of which is a brief description.

DETAILED DESCRIPTION

Figure 1:
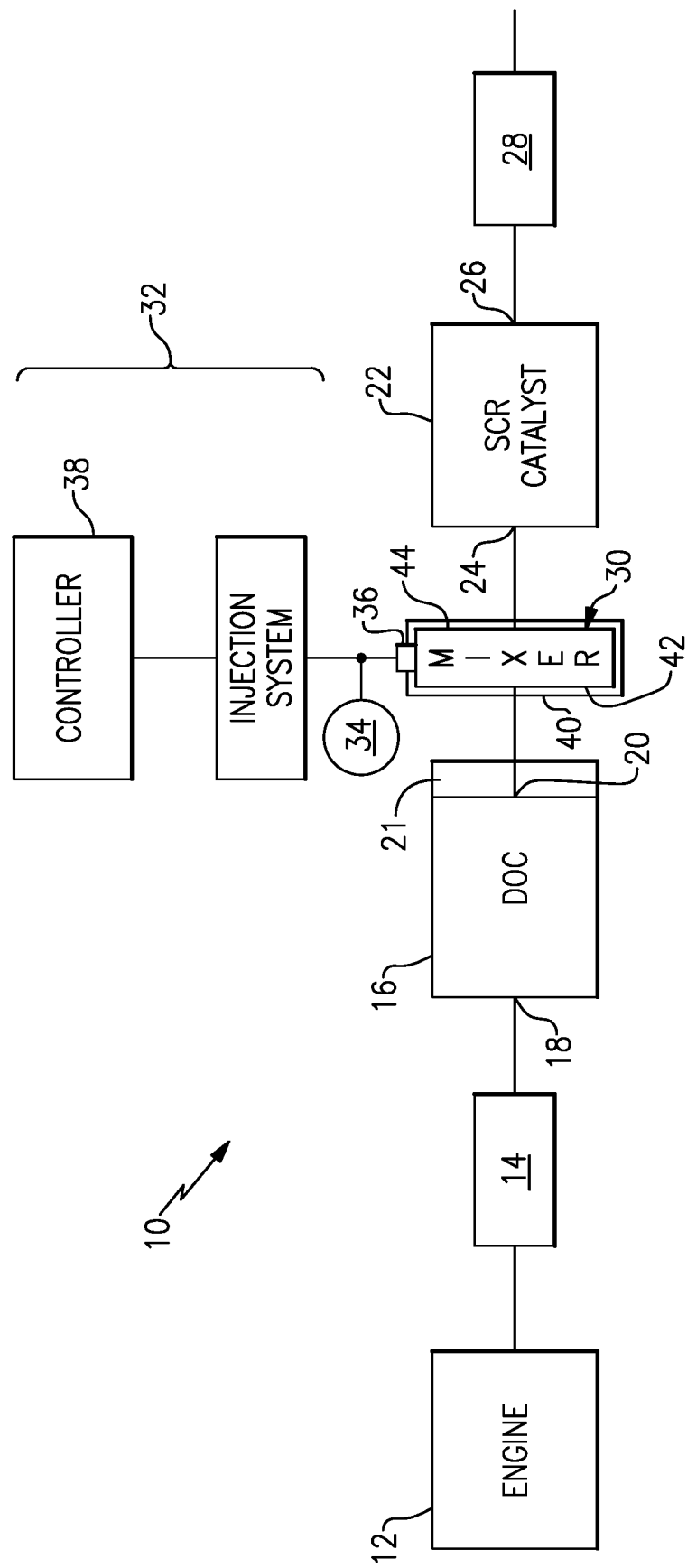
FIG. 1 is a schematic view of a vehicle exhaust system.

FIG. 1 shows a vehicle exhaust system 10 that conducts hot exhaust gases generated by an engine 12 through various upstream exhaust components 14 to reduce emission and control noise as known. Downstream from the engine are various upstream exhaust components 14 that can include one or more of the following in any combination: pipes, filters, valves, catalysts, mufflers, etc. In one example configuration, the various upstream exhaust components 14 direct exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known.

Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following in any combination: pipes, filters, valves, catalysts, mufflers, etc. The components shown in FIG. 1 can be mounted in various different configurations and combinations dependent upon vehicle application and available packaging space.

In one example configuration, a mixer 30 is positioned downstream from the outlet 20 of the DOC 16 or DPF 21 and upstream of the inlet 24 of the SCR catalyst 22. The mixer 30 is used to generate a swirling or rotary motion of the exhaust gas. Any type of mixing element can be used, such as that set forth in US 2012/0216513 for example, which is assigned to the assignee of the present invention and is herein incorporated by reference. An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser 36, and a controller 38 that controls injection of the urea as known. Such a system in combination with a mixer is disclosed in U.S. application Ser. Nos. 14/737,533 and 14/737,546 for example, which are assigned to the assignee of the present invention and are herein incorporated by reference.

Figure 2:
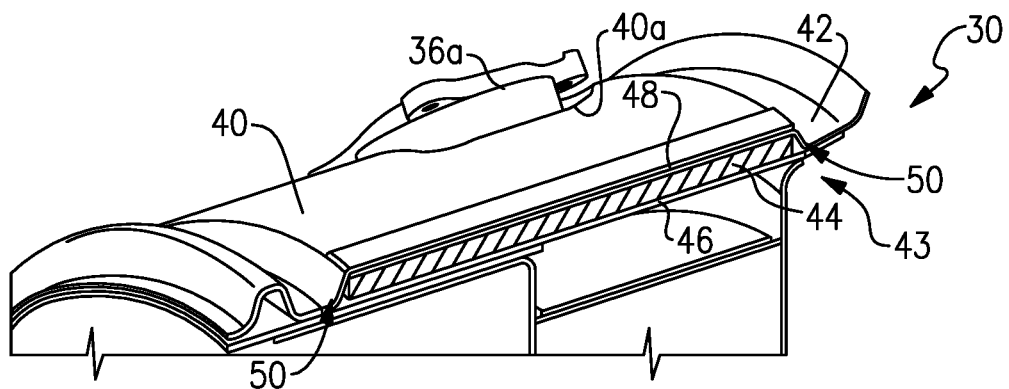
FIG. 2 is a perspective view in section of one example of a mixer and heat shield assembly as used in the vehicle exhaust system of FIG. 2.

In one example, the mixer 30 includes a heat shield 40 that is mounted to an outer housing 42 of the mixer 30 using a unique low conductive support mount configuration 43. The low conductive support mount 43 is configured such that the heat internally within the exhaust component is maintained at the desired temperature levels while the outer surface of the component is maintained at much cooler surface temperatures. In one example embodiment shown in FIG. 2, the low conductive support mount 43 comprises a primary insulator 44 that is located between an outer surface 46 of the outer housing 42 and an inner surface 48 of the heat shield 40, and at least one secondary insulator 50 positioned adjacent the primary insulator 44. The heat shield 40 includes openings as needed, such as for example, an opening 40a for a mount structure as for the doser 36 as shown in FIG. 2. The combination of primary 44 and secondary 50 insulators is used to insulate the heat shield 40 from the outer housing 42 by removing direct contact (conduction path) between the housing 42 and heat shield 40, while also maintaining a generally constant gap between them.

Figure 3:
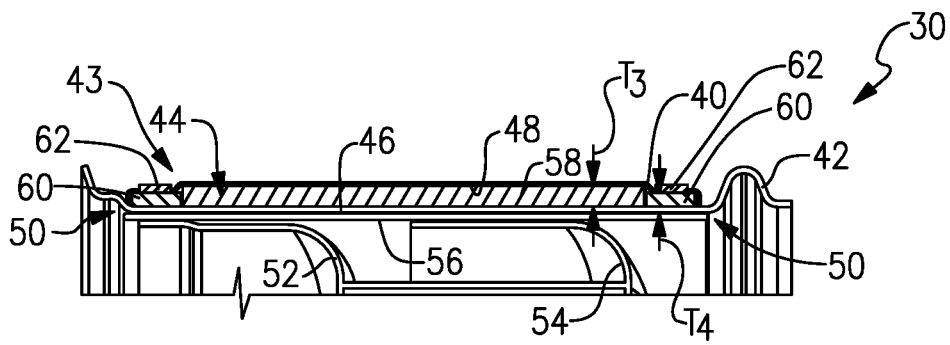
FIG. 3 is a section view of another example of a heatshield and mount assembly for a mixer such as that shown in FIG. 2, wherein the heatshield and mount assembly are in a compressed and final installation position.

FIG. 3 shows a section view of the mixer 30 which includes inlet 52 and outlet 54 baffles that are surrounded by a mixer body 56. The body 56 is mounted within the outer housing 42 of the mixer 30. In this example, the primary insulator 44 comprises an insulation mat 58 that surrounds the outer surface 46 of the housing 42. The secondary insulators 50 comprise one or more bands or rings 60 that are used in combination with the insulation mat 58 to mount the heat shield 40 on the housing 42. In the example shown, one ring 60 is placed at one edge of the mat 58 and another ring 60 is placed at an opposite edge of the mat 58. The heat shield 40 is placed over outer surfaces of the mat 58 and rings 60 and is then compressed radially inward to compress the mat 58 against the housing 42. One or more additional attachment structures such as straps or clamps 62, for example, are then used to hold the mat 58 in compression.

Figure 4:
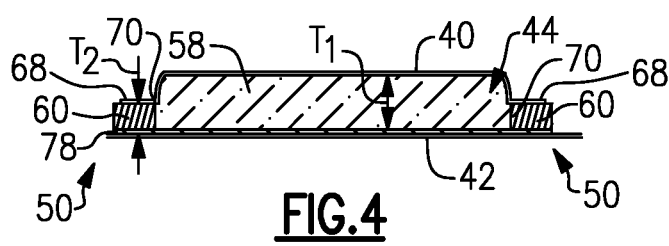
FIG. 4 is a schematic view of the heatshield and mount assembly of FIG. 3 in an uncompressed state prior to final installation.

FIG. 4 shows an example where the mat 58 in an uncompressed state and FIG. 3 shows an example of the mat 58 being in a compressed state where the heat shield 40 is secured using clamps 62. While clamps are shown in FIG. 3, it should be understood that other attachment structures could be used to hold the mat 58 and heat shield in compression against the outer housing 42.

The heat shield 40 is made from a non-metallic material such as composite or plastic material, for example. The rings 60 protect the mat 58, provide structural support for the heat shield 40, and resist movement of the heat shield 40 during vehicle operation. The rings 60 can comprise a band of fiber mat or a fibrous material such as rope, for example. The rings 60 preferably comprise bands of a high-stiffness mat, a rope of braided rope material, a rope of braided wire material, a rope that includes glass fibers, or other similar materials. The rings 60 can be comprised of a compressible or non-compressive material. In one example, the mat 58 has a first stiffness and the rings 60 have a second stiffness that is greater than the first stiffness.

In the example shown in FIG. 3-4, both the mat 58 and rings 60 are compressed by the heat shield 40 against the outer housing 42. FIG. 4 shows the mat 58 having an initial first thickness T1 and the rings 60 having an initial second thickness T2 in the uncompressed state. The heat shield 40 is then placed around the mat 58 and rings 60 and is compressed in a radially inward direction. This causes the mat 58 to be compressed to a final thickness T3 that is less than the initial first thickness T1, and the rings 60 to be compressed to a final thickness T4 that is less than the initial second thickness T2 (FIG. 3). The clamps 62 are then secured over opposing edges of the heat shield 40 at radially outward positions that overlap each of the rings 60 such that in this final installation position, the heat shield 40 is held in compression against the housing 42. Distal ends 68 of the heat shield 40 remained spaced apart from the housing 42 when compressed.

Figure 5:
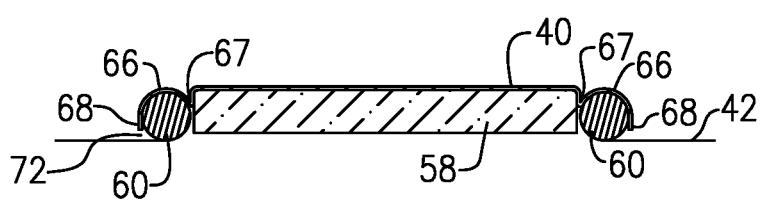
FIG. 5 is a section view of another example of a heatshield and mount assembly.

FIG. 5 shows an example where clamps are not used to hold the heat shield 40 in compression. Instead, edge portions 66 of the heat shield 40 are formed to extend around the rings 60. In one example, the edge portions 66 are formed as circumferential indentations. Optionally, the indentations could be replaced by barbs to hold the rings 60 in place. These edge portions 66 can be pre-formed and pressed against the mat 58 and rings 60 or the edge portions 66 can be plastically, i.e. permanently, deformed around the rings 60 during installation to hold the mat 58 and heat shield 58 in compression against the housing 42. The edge portions 66 can be roll-formed, stamped, molded, welded, cast, etc. An indented area 67 between an edge of the mat 58 and the curved indentation helps locate and define a boundary between the ring 60 and mat 58. The edge portions 66 help prevent movement of the heat shield 40 once the shield is compressed. The edge portions 66 are deformed such that the distal ends 68 of the edge portions 66 remain spaced apart from the housing 42 such that there is no direct heat transfer contact.

In this example configuration, the mat 58 provides structural support to attach the heat shield 40 to the housing 42 without the use of any other attachment structures. As portions of the heat shield 40 are compressed around the mat 58 and against the housing 42, the portions are subsequently attached to each other to hold the mat 58 and shield 40 in compression against the housing 42. This will be discussed in greater detail below.

In one example, the rings 60 can comprise a high-stiffness, non-compressive mat that is placed on opposing sides 70 of the mat 58. The heat shield 40 is compressed against the mat 58 causing the mat 58 to decrease in thickness from the initial first thickness to a smaller final second thickness while the non-compressive mat at each of the opposing sides 70 remains at substantially the same thickness. Clamps 62 or other attachment structures can then be used to hold the heat shield 40 in compression against the housing 42.

The configurations shown in FIGS. 2-5 each include a central insulating mat 58 and two pieces of material such as braided rope, braided wire, or high-stiffness mat that are placed at opposing edges 70 of the mat 58. The two pieces of material comprise the bands or rings 60, and in one example, these rings 60 are in direct abutting contact with the edges 70 of the mat, the outer surface 46 of the housing 42 and the inner surface 48 of the heat shield 40. Further, in each of the examples, once the heat shield 40 is held in compression against the housing 42, the distal edges 68 of the heat shield 40 remain spaced from the outer surface 46 of the housing by a gap 72 (FIG. 5).

Figure 6:
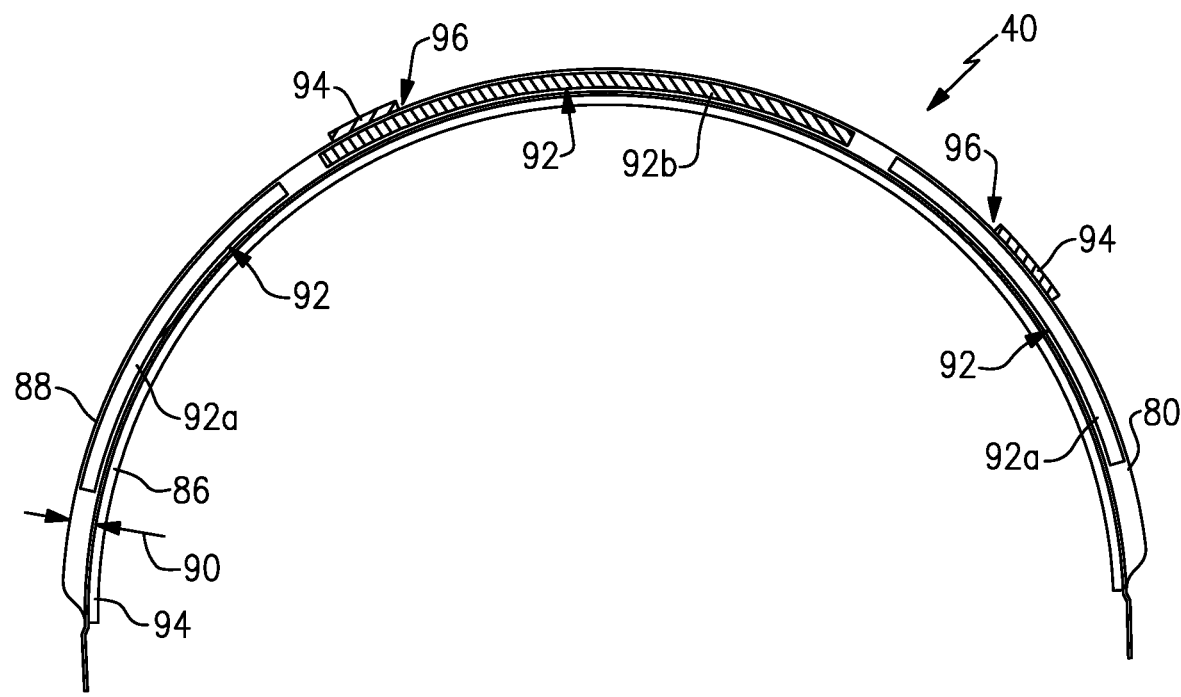
FIG. 6 is a schematic section view of another example of a heatshield and mount assembly.

FIG. 6 shows one example of a heat shield 40 that is formed from a composite material. The composite material can comprise a fiber-reinforced polymer or plastic material, a multi-layer composite material, etc. The heat shield 40 can be a solid part, a part made from multiple layers, or can comprises a honeycomb structure, for example.

The heat shield 40 can be formed as one or more composite shield portions 80 (only one is shown in FIG. 6) that are configured to surround the outer housing 42 which defines a central axis A. The portions 80 can be formed using processes such as molding, thermoforming, or additive manufacturing for example.

FIG. 6 shows one example of a C-shaped composite shield portion 80. The composite shield portion 80 includes an inner surface 86 and an outer surface 88 spaced radially outward of the inner surface 86. The distance between the inner 86 and outer 88 surfaces defines a thickness 90 of the composite shield portion 80. In certain locations, the composite shield portion 80 is solid throughout the thickness 90. However, the composite shield portion 80 may include one or more discrete internal cavities 92 that are encapsulated within the composite shield portion 80.

In one example, one or more of the cavities 92 comprises an internal air pocket 92a that is used to further enhance the insulating properties and/or to lighten the heat shield 40. In another example, one or more of the cavities 92b is filled with a material to further enhance the insulating properties and/or to stiffen and reinforce the heat shield 40. The material filling the cavities 92b can also be a composite material, or can be a structural material such as steel, wire mesh, etc. The additional material filling the cavities 92 can be included by over-molding, insert molding, additive manufacturing, or other similar processes.

In one example, the composite shield portion 80 can optionally include an additional layer of insulating material 94 attached to one or both of the inner 86 and outer 88 surfaces of the composite shield portion 80. The additional layer of insulating material 94 can comprise a wire mesh, a metal sheet, a foil sheet, etc. for example. The additional layer of insulating material 94 can cover an entire surface of the composite shield portion 80 or can cover only certain locations on the composite shield portion 80. For example, the additional layer of insulating material 94 can be added at identified hot spot locations 96 which are determined based on component type and application.

Figure 7:
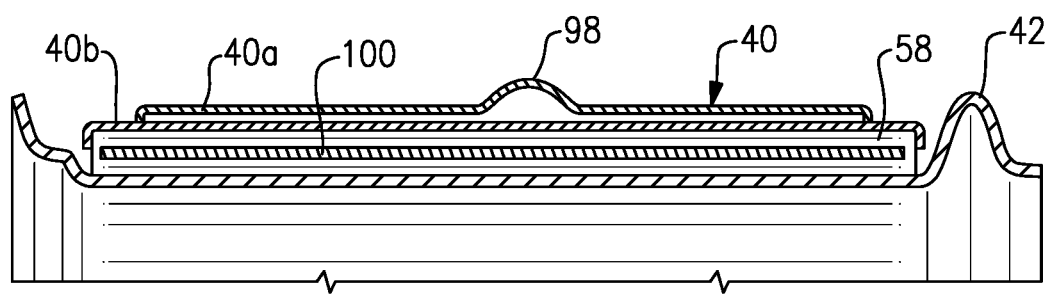
Figure 8A:
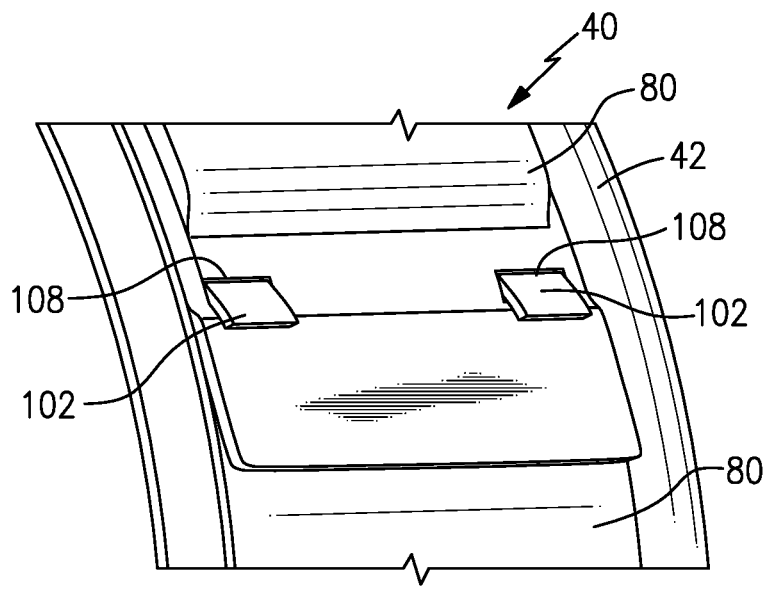
FIG. 8A is a perspective view of one example of connecting shield portions together.
Figure 8B:
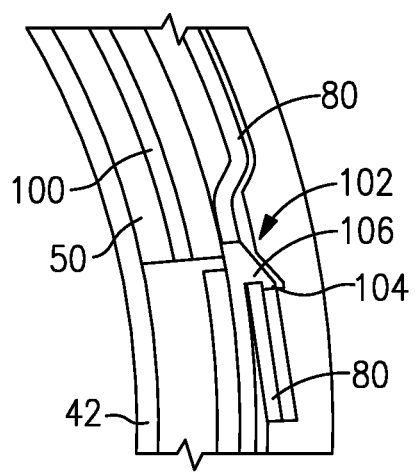
FIG. 8B is a side section view of FIG. 8A.
Figure 8C:
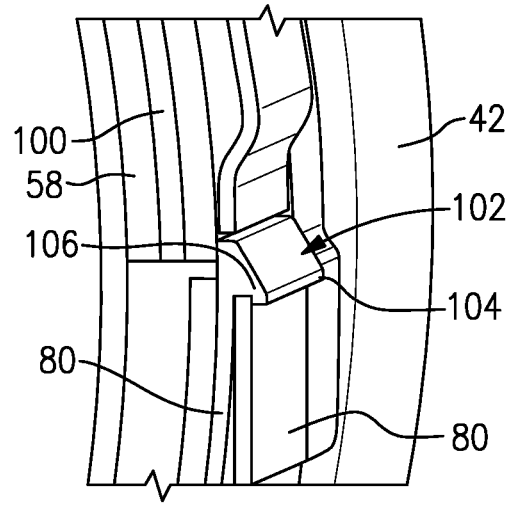
FIG. 8C is a perspective section view of FIG. 8A.
Figure 8D:
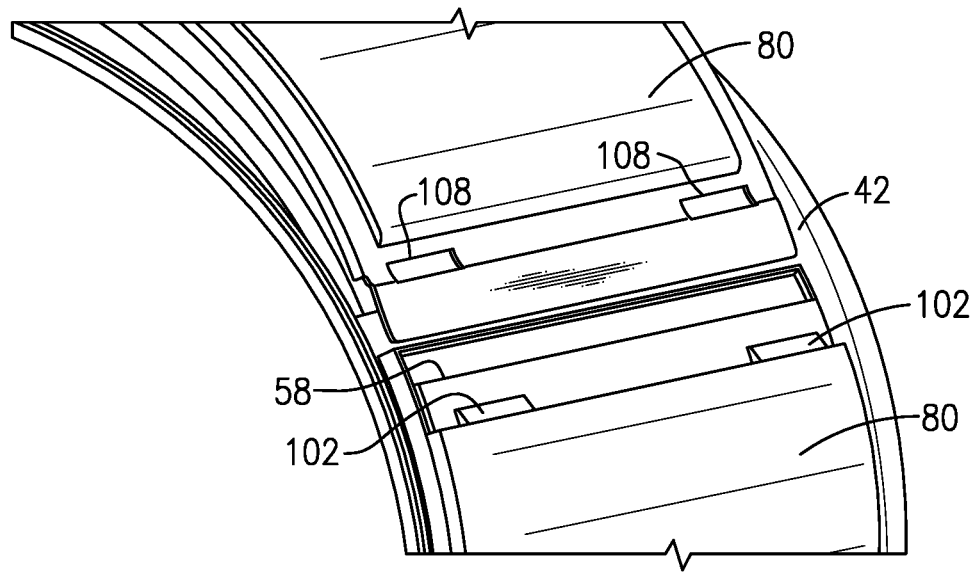
FIG. 8D is an exploded view.

In one example shown in FIG. 7, the composite shield portion 80 can also optionally include one or more ribs or protrusions 98 that extend outwardly from the outer surface 88 of the composite shield portion 80. Certain protrusions 98, such as ribs for example, can further facilitate the reduction of heat transfer while other protrusions can be used as standoffs or mounting posts to facilitate attachment of other components such as cables, wiring, sensors, etc. to the mixer 30. In one example, the protrusions 98 are integrally formed as one-piece with the composite shield portion 80 to provide a unitary, monolithic structure.

In one example, the heat shield 40 can include multiple layers such as an outer shield portion 40a and an inner shield portion 40b. The protrusions 98 in this example are formed in the outer shield portion 40a. Further, this type of shield 40 can be used in any of the disclosed examples. Also, the mat 58 may include one or more encapsulated cavities 100 (FIG. 7) that can be empty air pockets or filled with material such as microporous material, for example. This type of mat 58 could also be used in any of the disclosed examples.

FIGS. 8A-8D show one example of attaching shield portions together 80. One shield portion 80 includes one or more fasteners 102 and the other shield portion 80 includes corresponding openings 108 to receive the fasteners 102. In one example, the fasteners extend to a distal gripping finger 104 spaced from the shield portion 80 to form a groove 106 that receives a corresponding portion of the mating shield portion 80.

Figure 9:
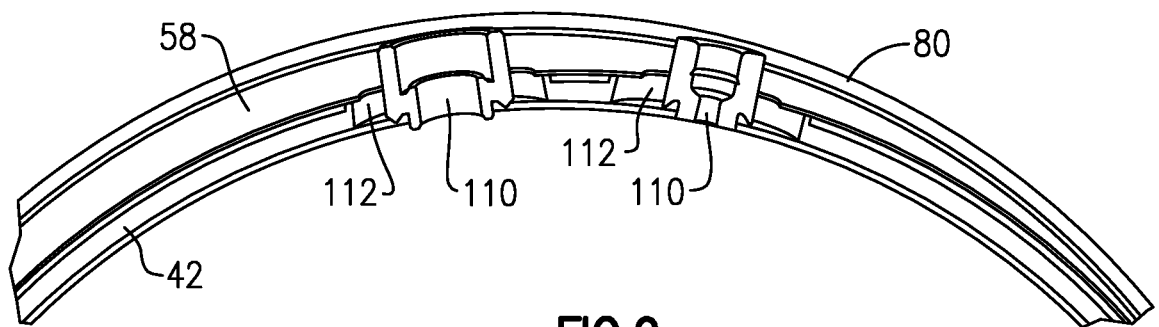
FIG. 9 is a sided section view showing one example of shielding around bosses.

FIG. 9 shows one example of shielding as used around bosses 110 that are associated with the housing 42. Recessed areas 112 are formed around the bosses 110. These areas 112 can be empty or further filled with insulating material as needed.

In one example, a support layer 78 (FIG. 4) for the mat 58 and/or rings 60 is applied to the outer surface 46 of the housing 42. In one example, the support layer 78 comprises a layer of adhesive material that holds the mat 58 and/or rings 60 in place until an attachment structure such as clamps 62, straps or bolts, for example, are installed to hold the heat shield 40 in compression against the housing 42. Optionally, the rings 60 and mat 58 can be attached to the support layer 78 to form an assembly that is then wrapped around the housing 42 as a unit. Use of the support layer 78 provides the benefit of a simple and effective installation of the heat shield 40.

In each of the examples, the rings 60 can be sealed or unsealed structures depending upon the desired specifications. Ideally, the rings 60 should provide structural support, insulation, and sealing to the heat shield 40 and component assembly. When the rings 60 are comprised of a rope made of braided fibers, the rope can be treated with a coating, for example, to be waterproof and to act as a seal. When the rings 60 are comprised of a band or ring made from a mat that is sensitive to water, an additional seal might be needed. This seal can be made of insulating foam or be a gasket made with heat-insulating material, such as mica, for example.

In one example, the central mat 58 and rings 60 can be manufactured as one assembly for easier installation. Further, the cross-sectional shape of the rings 60 can be circular, oval, square, rectangular, etc.

In one example, the rings 60 comprise two square or rectangular section braided wire bands that are 10-20 mm in width and which can withstand outer surface temperatures of 500-600 degrees Celsius. The polygonal section braided wire bands should have a high density/low compressibility such that when the bands are compressed they are approximately 7 mm thick in a radial direction. The ring material should comprise a material with very low thermal conductivity, such as less than 0.1 W/m·K at 600 degrees Celsius, for example.

In one example, the mat 58 comprises a fiber mat that is 10-15 mm thick when uncompressed (T1), and is approximately 7 mm when compressed (T3). As discussed above, a layer or sheet of adhesive can be applied to the housing 42 as the support layer 78, and the mat 58 and bands 60 can then be attached as a unit or individually in a direct manner to the adhesive. Optionally, the mat 58 and bands 60 can be attached to the adhesive sheet prior to attachment to the housing 42 with the components then being wrapped as an assembly about the housing 42. Once the mat 58 and bands 60 are in place on the housing, the heat shield 40 is installed such that the bands and mat are compressed.

FIGS. 2-5 show an example where the insulating mat 58 is comprised of a single layer of material. The mat could also be formed from a plurality of layers of material. Examples of multi-layer mats can be found in co-pending application 16/085,232 file on Sep. 14, 2018, which is a national phase of PCT/US17/23713 filed on Mar. 23, 2017, which is assigned to the assignee of the subject application and is hereby incorporated by reference.

Figure 10:
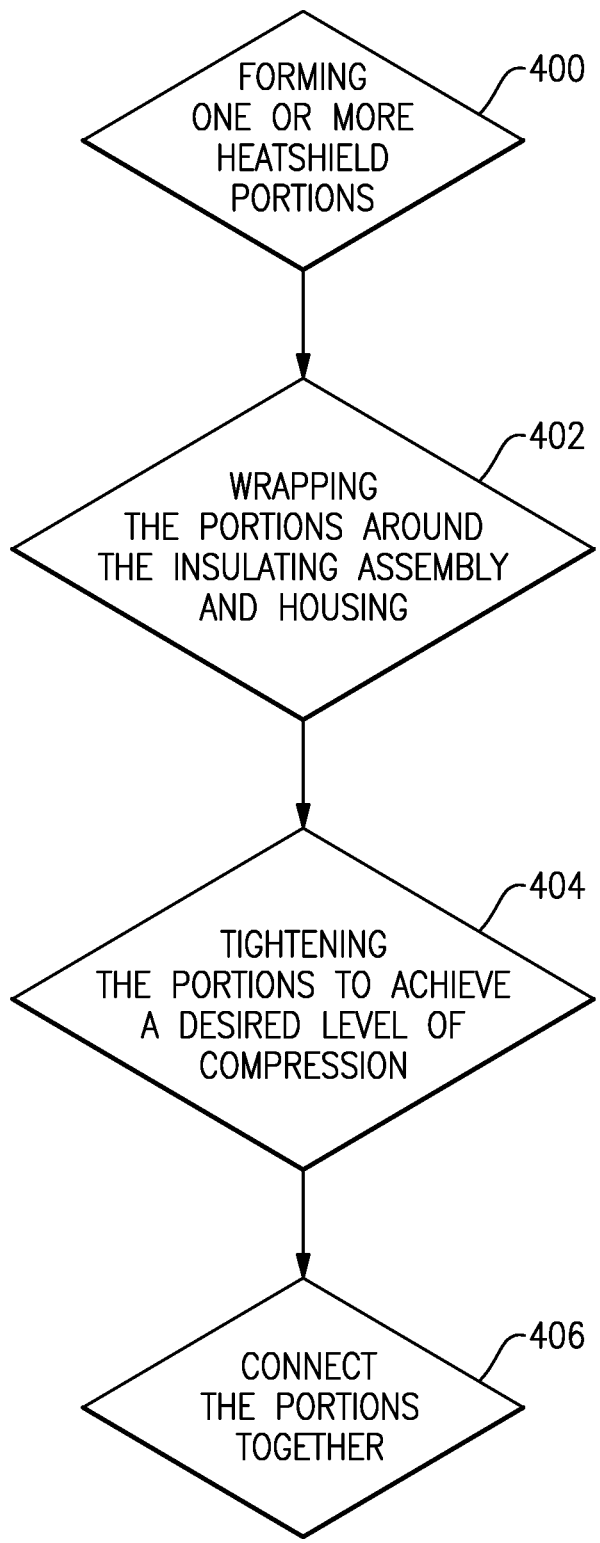
FIG. 10 is a flow chart describing one example method of assembling a heat shield onto an exhaust component.

FIG. 10 shows one example method of assembly that comprises a tourniquet process. In this example, the method includes a step of forming 400 the heat shield portions 80 as described above, for example, and then includes the step of wrapping 402 the portions 80 around the internal insulating assembly 44, 50 and mixer housing 42. The portions 80 are then tightened 404 around the internal insulating assembly and are held at a location where the portions 80 overlap with each other as shown in FIG. 7, for example. The portions 80 are tightened until a desired level of compressive force is achieved for the subject component application and are then connected to each other 406 at the overlap to be sealed via welding or brazing, for example, or by fastening the fasteners 102 in the openings 108. Other possible types of attachment of the portions 80 together include strapping, clamping, clipping, brazening or welding the portions 80 together. It should be understood that this is just one example of an assembly method and that other methods of compressing the internal insulating assembly 44, 50 can be used.

Once the portions 80 are attached to each other, the whole mixer assembly 30 is held together in compression. If the compressive force is not sufficient to maintain the assembly in place due to axial loading, some features can be added to the housing 42 to help keeping the assembly in place, such as mechanical stops for example. If the compressive force is not sufficient to maintain the assembly in place due to radial loading, additional mount structures such as straps, fasteners, or clamps 62 for example, can be installed on the heat shield 40.

It should be understood that while the heat shield 40 and unique low conductive support mount configuration 43 are shown in this example as being mounted to a mixer 30, the subject heat shield and associated mounting configuration can be used with any other vehicle exhaust system component as needed. For example, the subject heat shield mounting configurations could be used with mufflers, DOCs, DPFs, tailpipes, etc. Further, the subject heat shield mounting configurations could be used with larger box-shaped system components that include flat sides, where the heatshield would be pre-formed to get in compression.

The subject invention utilizes a unique mounting structure 43 for a heat shield 40 made from a composite material, where the mounting structure 43 comprises an insulator that supports the composite heat shield. An exemplary insulator comprises a primary insulator 44 in combination with one or more secondary insulators 50 as described above. The primary insulators 44 are used as structural support to attach the heat shield 40 to the outer housing 42. The secondary insulators 50 are configured to hold the heat shield 40 and primary insulator 44 in place relative to the outer housing 42. The secondary insulators comprise pieces of material, bands, or rings 60 that provide for a higher stiffness area than that of the primary insulator 44.

As discussed above, temperatures at the outer surface 46 of the housing 42 can be as high as 600 degrees Celsius. In each of the disclosed examples, the composite heat shield and mounting structure cooperate with each other to maintain as high as 90-99% of an outer surface of the heat shield at a temperature that can be as low as approximately 300 degrees Celsius or even as low as 200 degrees Celsius, for example, which is a significant improvement over existing heat shield configurations.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. An exhaust component assembly comprising:
a heat shield formed from a non-metallic material;
a mounting structure to attach the heat shield to an outer housing of an exhaust component that defines a center axis, wherein the mounting structure comprises an insulator located between an outer surface of the outer housing and an inner surface of the heat shield, and wherein the insulator has opposing edges axially spaced apart from each other in a direction along the center axis; and
at least one secondary support positioned between the outer surface of the outer housing and the inner surface of the heat shield adjacent to at least one of the opposing edges to provide structural support for the heat shield.

2. The exhaust component assembly according to claim 1 wherein the heat shield includes at least one rib.

3. The exhaust component assembly according to claim 1 wherein the heat shield has an outer surface spaced radially outward of the inner surface of the heat shield, and including an additional layer of insulating material attached to one or both of the inner and outer surfaces of the heat shield.

4. The exhaust component assembly according to claim 3 wherein the additional layer of insulating material comprises a wire mesh, metal sheet, or foil sheet.

5. The exhaust component assembly according to claim 1 wherein the heat shield includes an outer surface spaced radially outward of the inner surface such that a distance between the inner and outer surfaces defines a thickness of the heat shield, and wherein in certain locations the heat shield is solid throughout the thickness, and wherein in other locations the heat shield includes at least one internal cavity encapsulated within the non-metallic material of the heat shield between the inner and outer surfaces.

6. The exhaust component assembly according to claim 5 wherein the at least one cavity comprises a plurality of discrete internal cavities encapsulated within the heat shield and that are circumferentially spaced apart from each other about the center axis.

7. The exhaust component assembly according to claim 5 wherein the at least one internal cavity is filled with an insulation material.

8. The exhaust component assembly according to claim 1 wherein the non-metallic material comprises a fiber-reinforced composite material.

9. The exhaust component assembly according to claim 8 wherein the heat shield is comprised of one or more preformed shield portions that cooperate to surround the outer housing.

10. The exhaust component assembly according to claim 1 wherein the heat shield includes at least one protrusion extending outwardly of an outer surface of the heat shield, the protrusion configured to support a secondary component.

11. The exhaust component assembly according to claim 1 wherein the insulator comprises a primary insulator that is in direct engagement with the outer surface of the outer housing and the at least one secondary support comprises at least one secondary insulator that is separate from the heat shield and the primary insulator, the at least one secondary insulator being positioned adjacent to the at least one of the opposing edges of the primary insulator, and wherein the primary insulator has a first stiffness and the at least one secondary insulator has a second stiffness that is greater than the first stiffness.

12. An exhaust component assembly comprising:
a heat shield formed from a non-metallic material; and
a mounting structure to attach the heat shield to an outer housing of an exhaust component, wherein the mounting structure comprises an insulator located between an outer surface of the outer housing and an inner surface of the heat shield, and wherein the insulator comprises a primary insulator and at least one secondary insulator positioned adjacent the primary insulator, and wherein the primary insulator comprises an insulating mat wrapped around the outer housing, and wherein the at least one secondary insulator comprises at least a first piece of material positioned near one edge of the mat and a second piece of material positioned near an opposite edge of the insulating mat.

13. The exhaust component assembly according to claim 1, wherein the exhaust component comprises a mixer having an inlet baffle that receives exhaust gases from a vehicle engine and an outlet baffle that directs a mixture of exhaust gases and injected fluid to a downstream exhaust component, and wherein the inlet and outlet baffles are surrounded by the outer housing.

14. A method of assembling a heat shield to an outer housing of an exhaust component assembly comprising the steps of:
providing a heat shield made from a non-metallic material;
supporting the heat shield on a mounting structure configured to attach the heat shield to an outer housing of an exhaust component, wherein the mounting structure comprises an insulator located between an outer surface of the outer housing and an inner surface of the heat shield and wherein the insulator has opposing edges axially spaced apart from each other in a direction along a center axis defined by the outer housing; and positioning at least one secondary support between the outer surface of the outer housing and the inner surface of the heat shield adjacent to at least one of the opposing edges to provide structural support for the heat shield.

15. The method according to claim 14 wherein the insulator comprises a primary insulator that is in direct engagement with the outer surface of the outer housing and the at least one secondary support comprises at least one secondary insulator that is separate from the heat shield and the primary insulator, and including
positioning the primary insulator between the outer surface of the outer housing and the inner surface of the heat shield such that the primary insulator is in direct engagement with the outer surface of the outer housing,
positioning the at least one secondary insulator adjacent to the at least one of the opposing edges of the primary insulator such that the at least one secondary insulator abuts against the at least one of the opposing edges, and
placing the heat shield over the primary and secondary insulators such that the heat shield is held fixed relative to the outer housing.

16. The method according to claim 15 including compressing the heat shield against the outer housing.

17. The method according to claim 14 including forming the heat shield by thermo-forming, molding, or additive manufacturing.

18. The method according to claim 14 wherein the heat shield includes an outer surface spaced radially outward of the inner surface such that a distance between the inner and outer surfaces defines a thickness of the heat shield, and wherein in certain locations the heat shield is solid throughout the thickness, and including forming at least one internal cavity in other locations that is encapsulated within the non-metallic material of the heat shield between the inner and outer surfaces.

19. The method according to claim 14 including adding a layer of material on one or both of outer and inner surfaces of the heat shield.

20. The method according to claim 14 including integrally forming one or more protrusions to extend out from an outer surface of the heat shield.

21. The method according to claim 14 wherein the non-metallic material comprises a plastic material, multi-layer composite material, or a fiber-reinforced polymer material.

22. The exhaust component assembly according to claim 1 wherein the non-metallic material comprises a plastic material or composite material.

23. The exhaust component assembly according to claim 13 wherein the heat shield includes at least one injector opening configured to receive an injector that injects fluid into an internal cavity of the mixer to mix with the exhaust gases.

24. The method according to claim 14 wherein the exhaust component comprises a mixer having an inlet baffle that receives exhaust gases from a vehicle engine and an outlet baffle that directs a mixture of exhaust gases and injected fluid to a downstream exhaust component, wherein the inlet and outlet baffles are surrounded by the outer housing, and including forming the heat shield to have at least one injector opening configured to receive an injector that injects fluid into an internal cavity of the mixer to mix with the exhaust gases.

25. The method according to claim 15 wherein the primary insulator comprises an insulating mat wrapped around the outer housing, and wherein the at least one secondary insulator comprises at least a first piece of material positioned near one of the opposing edges of the mat and a second piece of material positioned near the other of the opposing edges of the insulating mat.

26. The method according to claim 18 wherein the at least one cavity comprises a plurality of discrete internal cavities encapsulated within the heat shield and that are circumferentially spaced apart from each other about the center axis.

* * * * *